United States Patent [19]

Keith

[11] Patent Number: 4,986,762
[45] Date of Patent: Jan. 22, 1991

[54] TERMINATION MODULE FOR USE IN AN ARRAY OF MODULES

[75] Inventor: Roger H. Keith, St. Paul, Minn.

[73] Assignee: Minnesota Mining and Manufacturing Company, St. Paul, Minn.

[21] Appl. No.: 394,127

[22] Filed: Aug. 15, 1989

[51] Int. Cl.⁵ .......................... H01R 13/73; G02B 6/36
[52] U.S. Cl. ................................. 439/131; 350/96.20; 439/534
[58] Field of Search ............... 439/131, 712, 713, 715, 439/534; 350/96.20, 96.21, 96.22; 174/57; 361/340, 393, 413, 415

[56] References Cited

U.S. PATENT DOCUMENTS

| | | | |
|---|---|---|---|
| 2,502,634 | 4/1950 | Smith | 439/738 |
| 3,950,053 | 4/1976 | Brighenti | 439/131 |
| 3,989,567 | 11/1976 | Tardy | 156/158 |
| 4,050,783 | 9/1977 | Tardy | 350/96 C |
| 4,268,100 | 5/1981 | Kekas et al. | 361/391 |
| 4,585,303 | 4/1986 | Pinsard | 350/96.20 |
| 4,752,110 | 6/1988 | Blanchet | 350/96.20 |
| 4,824,196 | 4/1989 | Bylander | 350/96.21 |
| 4,832,436 | 5/1989 | Goto et al. | 350/96.2 |

FOREIGN PATENT DOCUMENTS 0101970 8/1983 European Pat. Off. .

*Primary Examiner*—Neil Abrams
*Attorney, Agent, or Firm*—Donald M. Sell; Walter N. Kirn; John C. Barnes

[57] ABSTRACT

A module for use in an array for modules for terminating transmission lines and making them readily accessible to connection to distribution lines, the modules comprising small rectangular bases having an end wall supporting a connector, and means affording the tilting movement of each module intermediate the ends of each base to move the end wall from a position aligned with the end walls of other modules to a position affording ready access to the connector of the tilted end wall.

18 Claims, 5 Drawing Sheets

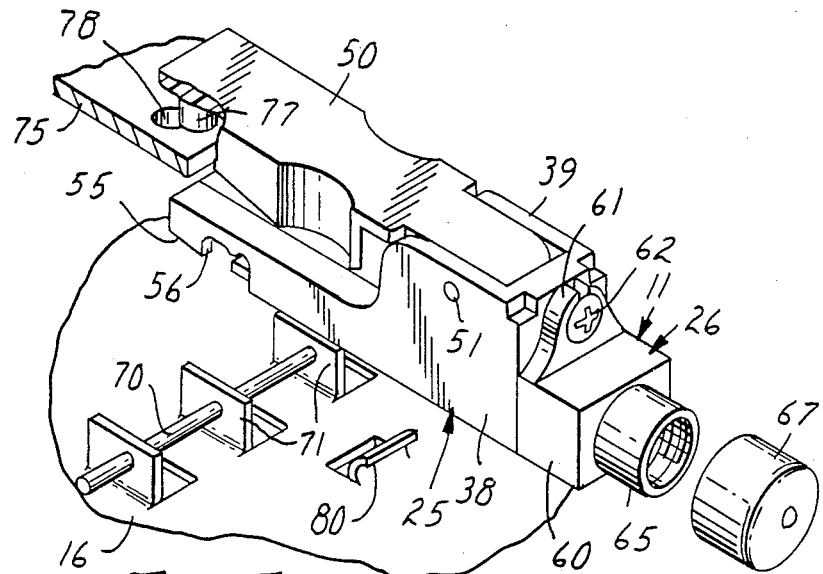

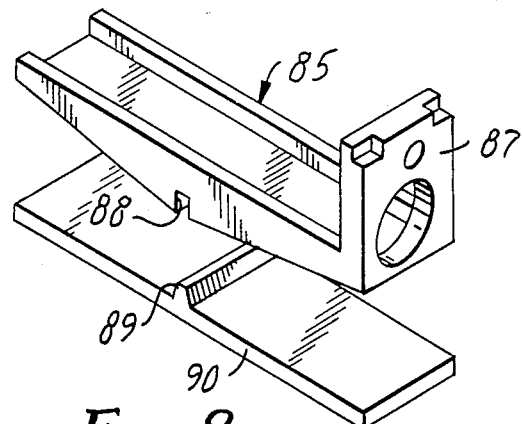
FIG.8
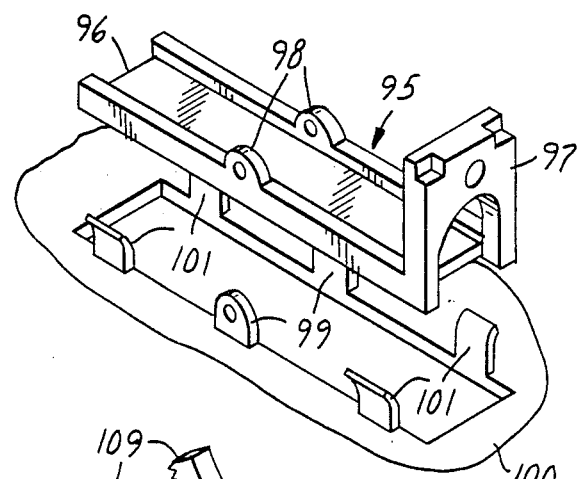
FIG.9
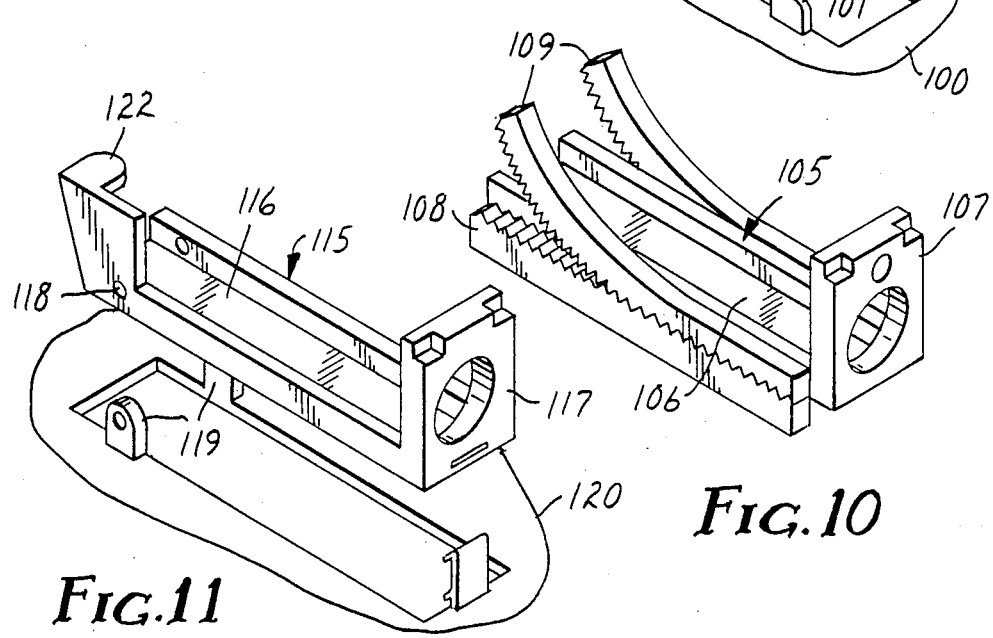
FIG.10
FIG.11

TERMINATION MODULE FOR USE IN AN ARRAY OF MODULES

BACKGROUND OF THE INVENTION

1. Field of the Invention

The present invention relates to a termination module for use in an array of modules for terminating transmission lines and in one aspect to a panel for supporting a plurality of modules to be connected to said transmission lines, i.e. optical fibers, copper, aluminum or other conductors, so they can be readily connected to distribution lined leading to opto-electronic or electronic equipment.

2. Description of the Prior Art

The present invention provides a module for connection to the common transmission wires entering a residence or factory or office work station where it is desired to have the service positioned in one spot. This requirement places a plurality of wires in close spaced relationship and it is desirable not to use a lot of space but provide easy access to the transmission lines for connection and disconnection of the distribution cables.

The prior art has a variety of panel configurations for connecting the lines in an incoming cable to the connectors and managing the connection of the lines to distribution lines. Such panels are provided for optical fibers, electrical power distribution, and telephone distribution. The present invention provides a module and panel wherein a plurality of modules can be closely positioned to provide termination of the cables for connection to the cables provided on electronic equipment such as opto-electronic equipment or on electronic equipment such as stereo receivers, television sets, telephones and computer work stations.

The present invention is directed at a simplified array of modules for use in terminating a small number of optical fibers, or fibers and transmission wires such as in an apartment building, a single family residence, or an office or factory work station. The prior art panels in some instances may be modular to afford their use with a small number of fibers but they are adapted to the large termination situations where many fibers or wires are terminated and the panels can be enlarged as the service needed increases. In the present environment it is necessary that the distribution lines be terminated in such a way that they can be connected and disconnected without calling a skilled technician. There are generally only a small number of lines and they should be conveniently packaged to permit a person with minimal assembly skills to make the connections and disconnections to the transmission lines coming into panel. A skilled technician will generally make the connection from the incoming line to the panel connector and then the minimally skilled assembler can make the connection to the panel connector. The connector usually includes a convenient connection to which a plug may then be readily connected to couple the incoming line to the desired equipment.

With optical fiber installations, the technicians are the workers with the responsibility of taking the optical fiber cable that has arrived at the termination station and separating the individual optical fibers from a buffer tube and then splicing them to a fiber end leading from a connector plug. The plugs are subsequently connected to a connector coupling for connection to a plug on a fiber running to an optoelectronic piece of equipment. When this piece of equipment is a piece of equipment in a home, factory or office work station and the number of optical fibers directed thereto are all contained in a single cable, or the cable contains optical fibers together with copper signal wires, it is desirable to have a convenient means of termination of the optical fibers as well as a convenient method of joining the copper wires to a distribution wire. This type of termination should not require any more skill than the technician that would routinely service and install telephone or electrical power. If it requires tools that cut and polish the optical fiber end and special fixtures to secure the finished fiber end in a plug, then the level of skill required to make only several connections at remote locations is economically and commercially disadvantaged, and the optical fiber communication system will not grow and be as readily available to as many citizens as rapidly as desired.

Presently, where large installations are made in a building or central station, a distribution housing is installed and the cable is brought in for distribution. Individual optical fibers from the cable are spliced to long pigtails, each consisting of individually jacketed optical fiber terminated into a connector plug at one end. The pigtail connector plug is mounted into a connector coupling located within the distribution housing or a remote second distribution housing. The splice joining the two fibers is placed within a splice holder within the first distribution housing. The surplus fiber from the pigtail and surplus fiber from the cable are both carefully stored in the distribution housing. A second plug mates with the first in the connector coupling and routes to an optoelectronic device or other intermediate junction. This is the routine which must be followed in the large installations since it is very possible that changes will be needed periodically and access to the splice and the slack fiber will be required. In the home, apartment or factory or office work station on the other hand, the connection will be made and there should be no need for a large distribution panel or box. The termination and its support and the support for the additional slack fiber should not exceed that same requirement for copper communication lines.

A prior device, identified as an optical cable header is described in U.S. Pat. No. 4,585,303. This device utilizes a plurality of optical connector supports which are engaged in a magazine or housing. The connector supports have an elongate body in the form of a hollow finger. The finger has a cylindrical connector member at a front end and a side mounted former upon which to wind a length of fiber located near to its opposite or rear end. The magazine has a row of cavities which are open at the rear of the magazine for receiving the supports and have circular openings in the front wall to receive the connector members on the connector supports when they are received in the cavities. In FIGS. 7–11 the optical connector support is shown to includes a finger, constituted by a rigid metal blade formed of elongate U shape. The optical connector is mounted in the bottom of the U to receive the end fitting of a fiber inside the finger. The optical connector will also receive an analogous end fitting of an external fiber for connection to the fiber inside the finger. The connector described in the introduction is an installed connection end fitting, for example the one described in French patent Nos. 2 275 787 and patent of addition 2 316 611, the earliest patent corresponding generally to U.S. Pat. Nos. 3,989,567 and 4,050,783. This connector is designed to receive one or multiple fibers, but to receive one fiber, requires an installation and in each end fitting, the end face of a fiber is rectified and suitably positioned for providing accurate optical connection when two connection fittings are brought together. The installation of the end fitting is not perceived as a field installation since U.S. Pat. No. 4,585,303 refers to the cable having a plurality of optical fibers with each fiber having a connection end fitting installed on its end. The purpose of the patented header is to avoid having to interrupt the connection of several fibers as with the connector of U.S. Pat. No. 4,050,783, when repairing a defect in the connection between any one pair of fibers. Further, after the supports are placed in the magazine, the connector members on the front face of the magazine are aligned in fixed position in a row and are not readily or individually accessible to make the desired connections.

Another mounting panel with means for supporting a plurality of connectors is shown in U.S. Pat. No. 4,752,110. This patent shows a cabinet for supporting incoming fibers, slack in those fibers, splices, connectors and pigtail fibers, and the plugs for the distribution fibers. This is typical of the prior art and is too bulky and unnecessarily complicated to provide the termination in the residence or apartment building. It is therefore an object of this invention to provide a termination which will reduce the need for large or bulky boxes to handle incoming and connector fibers to afford the installation of optical fibers into a residence and connection of the incoming optical fibers to opto-electronic equipment.

Previous methods of gaining finger access room to tightly spaced connectors have relied on the ability of wire and coaxial cable connections to sustain tight radius curvature and even right angle bends. This ability has allowed designers of connector arrays for electrical conductors to have close clearance in the design of the array through sudden changes in the axis of conductors, and no penalty is incurred by inducing tight bends into the conductors when connections are moved to obtain access.

Electrical connector groupings are also forgiving of movement of jumper wires and connections, since disturbing the connected wires has negligible effect upon signal continuity or transmission.

This is in contrast with optical fiber connections, where the fibers are typically restricted to a bend radius on the order of 20 or more times the outer diameter of the fiber and its jacket. Additionally, movement of optical fiber connections and cables can produce temporary or even permanent loss or reduction in signal carrying ability, due to unintended bending of fibers adjacent to a fiber being connected or removed.

As a result, the schemes which obtain electrical connector access in a tight array, such as through a push-pull action along the axis of the connection, are inappropriate for optical fiber work. The subject action of a slight tilt of the fiber axis is especially apt in that the bend of the fiber which is induced is not only of wide radius, but also the degree of bend is limited to a small arc, and the exiting fiber is subjected to only the minimal translation upwards which will provide access. If translation along the fiber were involved, in most installations, severe problems with bend radius kinks would result along the axis of the fiber. The method in which both of these factors are addressed here can be relied upon to contribute a negligible harm to the transmission properties of the fiber being worked on, and also give a negligible effect to adjacent fibers.

Although these minimal-disruption features are not crucially important in electrical connections, they are nevertheless desirable for connection of coaxial cables and other conductors where cable diameters restrict conductor bending, and in any event comprise a useful and versatile system where it is desired to connect optical fibers and electrical cables in a single housing, or to standardize on a single termination type for a distribution location or system. Frequently, optical fiber cables will also incorporate one or more "talk pairs" or "order pairs" to allow craft persons to communicate during installation or maintenance, or to provide power to run ringing bells, warning lights, and other associated electrical devices on what is primarily an optical transmission system. Hybrid systems with paired wire, coaxial cable and optical fiber for broadband communications are also seen, and a system which can terminate all types of communication media with interchangeable plug-in units has versatility in addition to functional benefits with any one of the media it accommodates.

It is a further object of the present invention to provide a module which can be packaged in an array wherein the modules are in side-by-side relationship to fit in a compact panel, in an array with other modules, in such a manner as to afford ready access to the individual connectors for attachment of the distribution fibers or other lines.

SUMMARY OF THE INVENTION

The present invention provides a novel termination module for use in terminating a cabled optical fiber or other transmission cable at a connector to which connection can readily be made by a ubiquitous type of plug such as a phono-type plug on coaxial cable, optical fiber plug, the RJ-11 plug on a telephone cable or the pin plug for an antenna or cable connection. The module is particularly adapted to terminate the individual transmission lines and to mate with other modules to provide a compact array of modules, each having a connector as readily accessible when required as a single module.

The module comprises a frame for supporting a single connector plug supported at one end of the frame and connected to one end of a transmission line. The frame has a generally tubular profile, including a generally rectangular base extending from the aforesaid end of the frame. The base is generally rectangular with a longitudinal axis and is provided with means for tilting the base about an axis transverse to the longitudinal axis and intermediate its ends such that the one end of the frame may be raised from the normal plane of the base to a position above the ends of the other modules in a side-by-side array. This type of module avoids the need to space the modules or the connectors to afford ready access to the connectors to connect or disconnect a distribution line to the connector. The means for tilting the base about an axis transverse to the axis of the base includes a fulcrum about which the base can be rocked or the base can rock on a rocker which will allow the one end to rise above the other ends of the adjacent modules. The modules are preferably mounted for tilting movement about a common axis so they maintain alignment or they are otherwise located to maintain a normally fixed position.

Means are provided for restricting movement of the modules when in the normal position. The modules can be moved to the connect position against the resistance of the stop, detent or spring used to retain the module. The axis for mounting the modules is formed in the bottom of a shallow tray and modules are arranged in a side-by-side array. Means is provided in the tray for storing slack fiber from the transmission line. The storage area is preferably provided with a cover to limit access thereto because after the technician has made the connection to the connector the remaining connections are made to the couplings and such can be made by raising the coupling from the plane of the other couplings and have free access to the coupling desired.

BRIEF DESCRIPTION OF THE DRAWING

The present invention will be further described with reference to the accompanying drawing wherein:

FIG. 5 is an exploded perspective view of a module positioned above the support plate of the panel to illustrate the mounting of the module;

FIG. 6 is a longitudinal sectional view of a module on the support plate showing the module in the normal position;

FIG. 7 is a longitudinal sectional view similar to that of FIG. 6 showing the module in the tilted or raised position to afford easy access to the connector;

FIG. 8 is an exploded perspective view of a second embodiment of a module and a support plate for the module;

FIG. 9 is an exploded perspective view of a further embodiment of a module and a support plate for the module;

FIG. 10 is a perspective view of a further embodiment of a module and a support base for tilting the module;

FIG. 11 is an exploded perspective view of a further embodiment of a module and a support plate for the module;

DESCRIPTION OF THE PREFERRED EMBODIMENTS

Figure 1:
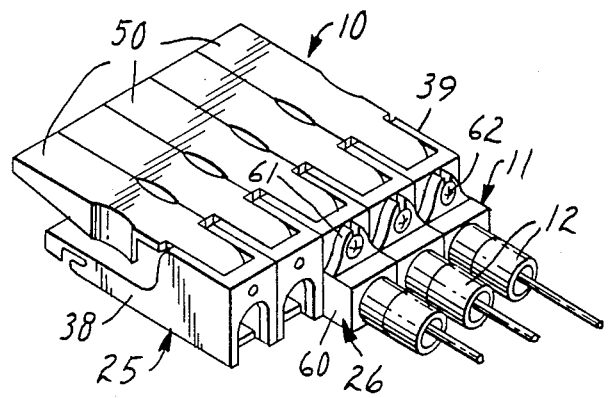
FIG. 1 is a perspective view of an array of optical fiber termination modules according to the present invention in a side-by-side array.

The optical fiber termination splice module and the array formed upon packaging of the same according to the present invention will be described with reference to the accompanying drawings wherein like parts are identified by the same reference numerals throughout the several views.

Figure 2:
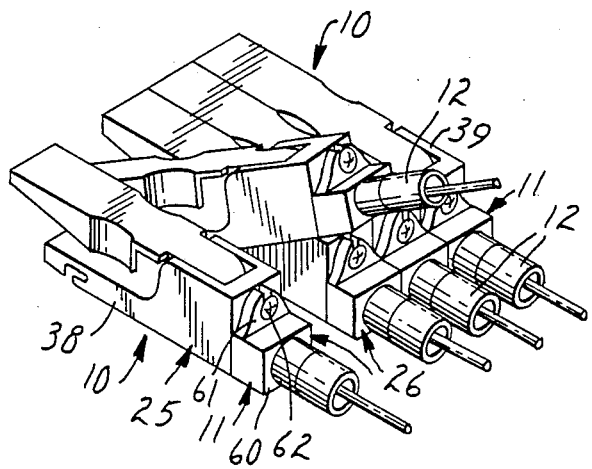
FIG. 2 is a perspective view of the module array of FIG. 1 with a single module tilted to illustrate easy access to the connector.

When connectors are placed in juxtaposition it is often very difficult for a person to obtain proper access to the connector for the purpose of coupling or uncoupling a plug to a connector and not risk damage to or contact with the other connectors. Therefore, the present invention has as an object the provision of a termination module 10 having a connector 11 thereon which module 10 can be placed on the end of a signal conductor and placed closely adjacent another module 10 terminating a second signal conductor, but which affords the separation of the connectors to afford facile coupling and uncoupling thereto. As illustrated in FIGS. 1 and 2, the closely packed modules 10 do not allow access by the fingers readily when it is desirable to couple or uncouple a plug 12 from a connector 11 when the modules are arranged in side-by-side position. A module according to the present invention allows the desired module to be tilted, raising the connector from the side-by-side location allowing ready access to the connector as is shown in FIG. 2.

The array of modules 10 are preferably positioned in a tray 15 adapted for mounting in a cupboard or closet such that the modules are kept in order and conveniently, centrally located. The tray 15 is a shallow rectangular tray with a base 16 and side walls 17 which project upwardly from the base 16. One area on one end of the base is dedicated to receiving and storing a length of the optical fibers. The tray side walls 17 are provided with perforated areas 18 which can be removed to afford entry of the signal conductors into the storage area. Additional knock-out areas 19 afford exit openings for the distribution fibers. A plurality of ears 20 are formed in the storage area about which the conductors may be wrapped to form one or more loops. As illustrated the conductors are wrapped on ears 20 which are formed from the base and positioned to define a loop area at least twice the minimum bending radius for an optical fiber of the incoming fiber buffer tube 21. The individual fibers 22 are then directed from the loop to the individual modules 10.

The module 10 illustrated in FIGS. 4, 5, 6, and 7 comprises a small frame or support 25, the coupling 26 of the optical fiber connector 11, a single connector plug 28 connected to one end of a short length 29 of optical fiber and joined to one end of the coupling 26, an optical fiber splice 30 having opposite open ends for making connection between a second end of the length 29 of optical fiber and the free end of the optical fiber 22 from a cable 21, as previously described.

Figure 4:
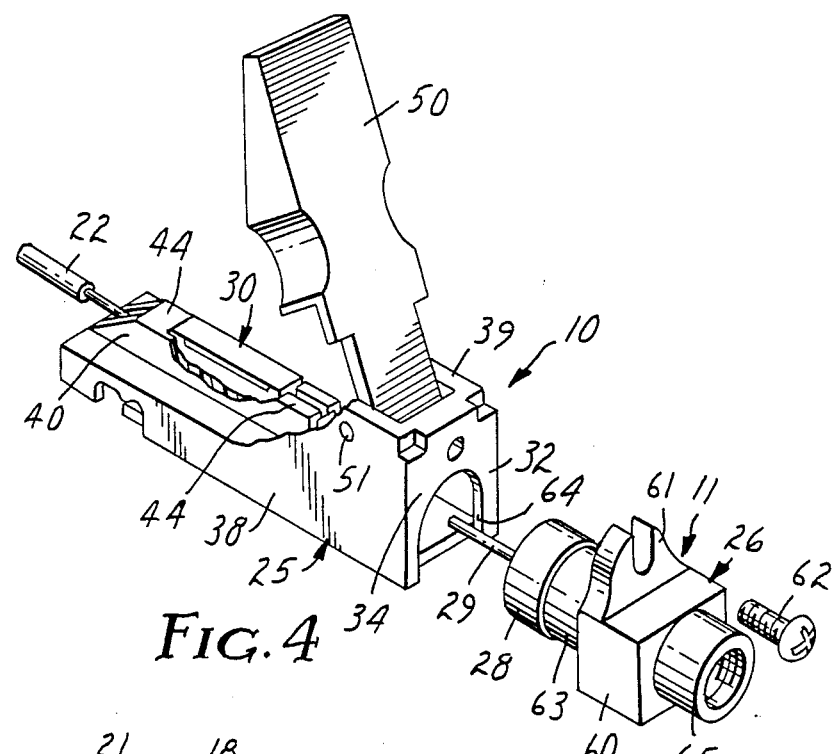
FIG. 4 is an exploded perspective view of an optical fiber termination module illustrating the several parts thereof.
Figure 3:
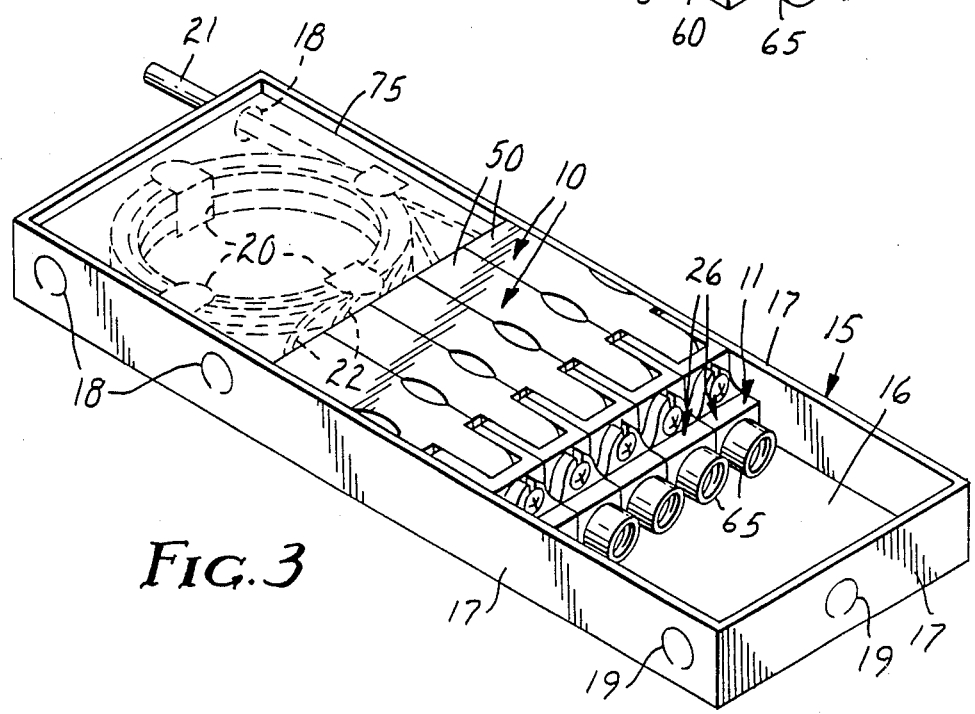
FIG. 3 is a perspective view of the array of termination modules packaged in a tray-like panel adapted to fit compactly in a cupboard or closet.

The frame or support means 25 for supporting the coupling 26 and the splice 30, comprises an end wall 32 having four sides and two faces 33 and 34, and an opening therethrough for supporting the connector coupling 26 in fixed position thereon and a base 35. The base 35 is a narrow elongate strip molded integrally with and joined to one side of the end wall 32 and the base 35 extends in a direction away from the face 33 of the end wall 32. The frame or support means 25 also includes a pair of side walls 38 and 39, and means defining a magazine 40 for supporting the splice 30 in close spaced relationship to the end wall 32, allowing space for connection of the plug 28 into the coupling 26. The magazine 40 is shaped to receive the splice 30 and to hold the same in a position aligned with the plug 28 to receive, in the splice 30 at a position approximately half the length of the splice, the second or free end of the length 29 of optical fiber fixed in the plug 28. The magazine 40 has wall members to receive and support the splice in position to permit the splicing of an incoming fiber with the length of fiber 29 to be completed. In FIG. 4 the magazine 40 is shown as a channel shaped member, shaped to fit the shape of the splice 30 placed therein.

In the illustrated magazine 40 a splice according to U.S. Pat. No. 4,818,055, issued Apr. 4, 1989, is placed between walls of the magazine 40 forming a U-shaped recess. The recess is closed at the top adjacent the ends to secure the splice 30 therein and restrict displacement of the splice during shipping of the module 10 since it is not secured to the optical fiber 29 and the splice 30 could be removed. The end walls 44 which cover upper ends of the recess restrict the splice 30 from being removed from the top of the magazine 40. The presence of the fiber 29 in the splice 30 and a stop at the rear of the magazine 40 restrict movement of the splice 30 endwise. An opening in the rear of the magazine permits the entry of the optical fiber 22 to be terminated into the splice 30 positioned in the magazine 40.

In a preferred embodiment the module 10 includes a cover 50 hinged, about a pivot axis 51 extending through the side walls 38, 39, in relationship to the base 35 to be positioned over the splice 30. The splice 30 is formed with a body and a cover which is forced into the body when the splice is made. Entry of the cover into the body forces legs of an aligning element to engage the opposed optical fiber ends and axially align the two ends. The cover 50 is thus provided with a projection 52 intermediate its ends which is positioned over the magazine 40 to engage the cover of the splice and force the same into the body as the cover is moved forcibly to the position over the base 35. During shipping or storage of the module 10 a dust cover may be placed over the magazine and splice to restrict closure of the cover into the splice body and dust from entering the splice. Also in the illustrated embodiment the base is provided with an inclined trailing edge as indicated at 55 and a notch 56, to be further described, is formed adjacent the inclined edge to afford means to support the module and to afford pivotal movement of the module to allow the end wall 32 to be raised above the normal plane of the base.

The coupling 26 comprises a rectangular housing 60 from which extends a mounting flange 61 having a slotted aperture to receive a fastener 62. The fastener 62 will fit a threaded opening in the end wall and thus suitably mount the coupling 26 to the end wall 32 with one cylindrical internally threaded, plug receiving, projection 63 thereof extending through an opening 64 in the end wall 32. A second cylindrical projection 65 is positioned for receiving the plug on the end a cable extending from a piece of opto-electronic equipment. A removable cap 67, illustrated in FIGS. 5 and 6, is preferably placed over the projection 65 to limit dust or other material from entering the cavity of the coupling and covering the end of the fiber 29.

The module 10 fits in the tray 15 in a side-by-side array with a number of other modules. The base 16 of the tray is provided with means to define a fulcrum for the modules to permit the modules to be tilted. When tilted, the end walls 32 of the modules are raised to position the couplings of the tilted module 10 in a position where it is convenient for a person of minimal assembly skill to connect or disconnect a plug 12 to the projecting end 65 of the coupling.

In the illustrated embodiment the fulcrum is formed by a rod 70 extending transversely of the base 16 of the tray and spaced above and parallel to the surface of the tray. The rod 70 is supported by ears 71 formed by bending strips upward from the base which strips are formed by making U-shaped cuts in the base to form the strips and to form rod receiving apertures in the strips. The rear portion 55 of the base 35 of the module 10 is beveled or truncated to permit pivotal movement of the module intermediate its ends in one direction. The degree of the bevel determines the amount the module can tilt and the beveled edge defines stop means for limiting the pivotal movement. The notches 56 formed in the base 35 of the module adjacent inclined surface 55 define the fulcrum point and are formed to secure the module 10 onto the rod 70, so it can be installed and later removed if desired. The notches 56 thus have a portion extending the width of the base 35 and generally perpendicular to the plane of the base and an offset portion shaped to receive the rod 70, with the entrance to the offset area being at the end of the first portion and having a boss at the mouth of the offset portion narrowing the entrance to removably capture the rod in the offset portion, as illustrated in FIGS. 6 and 7. The module support is made of a resilient polymeric material allowing the rod to be snapped into position where it permits the pivotal movement and restricts movement lengthwise.

A plate 75, preferably formed of a transparent material, is adapted to be positioned over the slack storage area of the tray. The plate can be in the form of a hinged door or a sliding cover as illustrated. This plate 75 is provided to protect the slack fiber from mishandling and extends to a position along the ends of the modules. The plate 75 can then conveniently provide means for retaining the modules 10 in the tilted position. This is accomplished in the illustrated embodiment by the plate 75 providing lip means to engage a further projection 77 on the underside of the cover 50 of the module 10, when the module is pivoted about the fulcrum 70 to the raised position, see FIG. 7. In the illustrated embodiment the lip means is defined by the edge of openings 78 formed along the edge of the plate 75. In the normal position of the plate and the modules 10, the plate and the projections 77 of the covers of the modules hold the covers 50 in a position with the projections 52 spaced from the cover of the splice 30.

Resilient retaining clips 80 are formed from the base 16 of the tray 15 to position one clip beneath each module 10. The clip 80 is received in a recess 81 in the base 35 of the module 10, past a catch 82 to form a detent for holding the module in the normal operating position, see FIG. 6. This clip will frictionally engage the wall of a recess 81 and restrict the pivotal movement about the rod 70 and restrict lengthwise movement in relationship to the rod 70 when in the normal position.

Alternative embodiments for providing a frame or support means for a module and means for tilting the module are illustrated in FIGS. 8–11. In FIG. 8 the support means 85 comprises a rectangular base 86 having a longitudinal axis and having an end wall 87 at one end of the base. Intermediate the ends of the base 86 is a transverse recess 88. The recess is adapted to receive a rib 89 on a base plate 90 to afford tilting of the module.

In FIG. 9 the support means 95 comprises a rectangular base 96 having a longitudinal axis and having an end wall 97 at one end of the base. Intermediate the ends of the base 96 is a transverse axis defined by upstanding ears 98. The ears 98 cooperate with ears 99 on a base plate 100, which receive pins or a rod (not shown) to support the base 96 for pivotal movement to tilt the end wall 97 to a position above the plate 100. Resilient clips 101 aid to retain the module of FIG. 9 in rest position.

In FIG. 10 the support means 105 comprises a rectangular base 106 having a longitudinal axis and having an end wall 107 at one end of the base. The base 105 is mounted to tilt about an imaginary axis by means of spaced racks 108 and segmented pinions 109 secured to the base 106, which form a rocker for the module. The teeth of the rack and rocker maintain the base in position on the support plate for the racks 108.

In FIG. 11 the support means 115 comprises a rectangular base 116 having a longitudinal axis and having an end wall 117 at one end of the base. Intermediate the ends of the base 116 is a transverse axis defined by aligned apertures 118. The apertures 118 cooperate with upstanding ears 119 on a base plate 120, which receive pins or a rod (not shown) to support the base 116 for pivotal movement to tilt the end wall 117 to a position above the plate 120. A resilient post 121, having a catch, mounted on the plate 120 is positioned to engage a recess on the end wall 117 to retain the module of FIG. 11 in rest position. The support 115 is also provided with means to facility the tilting of the module of FIG. 11 in the form of a key 122 positioned on the side of the transverse axis defined by ears 119 opposite the end wall 117.

Figure 12:
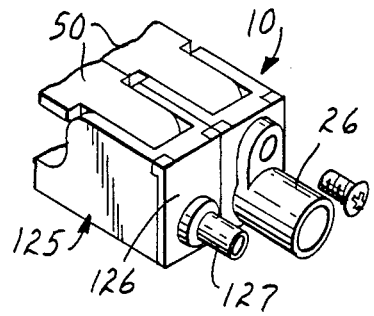
FIG. 12 is a fragmentary perspective view of a pair of modules in a side-by-side array with the modules having two different types of couplers on the end wall.

FIGS. 12, 13, 14 and 15 illustrate modules according to the present invention having various types of termination connectors positioned on the end wall. For example, the module 10 in FIG. 12 is fitted with an optical fiber coupling 26 and the module 125 is provided with an adapter plate 126 and an optical fiber coupling 127 of a different pattern or type such as an ST, D4, SMA or FC type, wherein the coupling comprises an externally threaded hollow metal sleeve which is held in the end wall by a collar and threaded washer.

Figure 13:
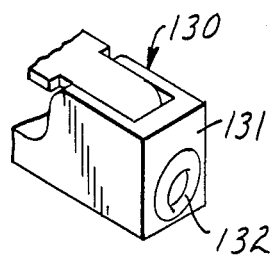
FIG. 13 is a fragmentary perspective end view of a module having a grommet in the end wall.

In FIG. 13 the module 130 has an end wall 131 formed with an opening therethrough having a grommet 132 lining the opening. This module 130 can be used in situations where it is desirable to merely splice two optical fibers together at the splice in the magazine and the grommet 132 supports the optical fiber in the end wall.

Figure 14:
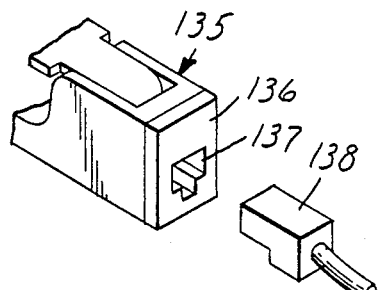
FIG. 14 is a fragmentary perspective end view of a module having an RJ-11 jack for a telephone plug also illustrated in perspective.

The module 135 of FIG. 14 has an end wall 136 which supports the conventional telephone RJ-11 phone jack 137 to connect a telephone plug 138 to a transmission line.

Figure 15:
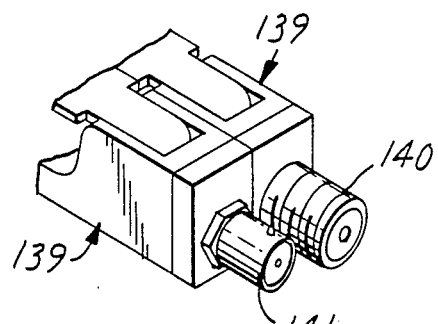
FIG. 15 is a fragmentary perspective end view of a pair of modules in a side-by-side array with data, television and phono-type coaxial connectors mounted in the end walls of the modules.

In FIG. 15 two modules 139 are illustrated which have different connectors, a connector 140 for a coaxial cable, such as a television antenna or data transmission cable, and a connector 141 having one or more pins for a stereo receiver. These are common connectors for transmission lines to which a household makes connection for receiving the electronic signals. Similar connectors are used in offices and factories for data and control services.

The present invention thus provides a termination module for use in terminating transmission lines of different kinds, which module can nest with other modules, having identical or different connectors, in a close-packed side-by-side array in a shallow tray, allowing individual modules in the array to be tilted to a position allowing ready access to the connector thereon for connection or disconnection of distribution lines. The overall length of the module is not greater than 12 inches (30.5 cm). The amount the connector is tilted from the position of the connector in the side-by-side array is between one-half and four times the diameter of the connector or the vertical dimension of the connector, and is preferably between one and two times either of these dimensions.

Having described several embodiments illustrating the invention, it will be appreciated that further modifications can be made without departing from the scope or the spirit of the invention as defined in the appended claims.

I claim:

1. A module for use in terminating a communication transmission line at a distribution panel comprising
a connector adapted to be connected to one end of a transmission line,
support means for supporting said connector, said support means comprising an end wall having two faces for supporting said connector in fixed position thereon and a rectangular base joined to said end wall at one end thereof and extending in a direction away from one face thereof, said base comprising an elongate narrow strip having a top surface and a bottom surface, means defining an axis transverse to said bottom surface for affording tilting movement of said base to move said end wall from a first normal position to a spaced position for affording easy access to said connector, said means defining said axis transverse to said bottom surface comprises a recess spaced from said end wall for receiving a rod about which said base may pivot, said recess including an offset area for receiving a said rod, and said base includes a portion extending away from said recess in a direction opposite said end wall defining stop means for limiting said tilting movement.

2. A module according to claim 1 wherein said elongate narrow strip is integrally molded with said end wall.

3. A module according to claim 1 wherein said end wall supports an optical fiber connector.

4. A module according to claim 1 wherein said end wall supports a telephone connector.

5. A module according to claim 1 wherein said end wall supports a coaxial connector.

6. A module according to claim 1 wherein said end wall supports a stereo receiver connector.

7. A plurality of transmission line termination modules positioned in side-by-side relationship, each module comprising
a connector adapted to be connected to one end of a transmission line, and
support means for supporting said connector, said support means comprising an end wall having two faces for supporting said connector in fixed position thereon and a rectangular base joined to said end wall at one end thereof and extending in a direction away from one face thereof, said base including means defining an axis transverse to said base for affording tilting movement of said base of each module to move said end wall of each module independently of the other modules from a first normal position aligned with the connectors of adjacent modules to a spaced position in relationship to said adjacent connectors for affording easy access to said connector for connecting or disconnecting a distribution line with said connector, and for returning said modules to said normal position.

8. An array according to claim 7 wherein said base of each of said modules are supported by rod means to afford the tilting movement and each said base is provided with means for receiving rod means intermediate its ends for affording the movement of said end wall.

9. A distribution panel for use in connecting transmission lines to connectors affording further distribution, said panel including a support plate, said support plate having a generally planar surface and means for defining a fulcrum, and a plurality of termination modules positioned in a side-by-side array on said plate and supported on said fulcrum for independent tilting movement, each module comprising a connector adapted for connection to a transmission line, and support means for supporting said connector, said support means comprising an end wall having four sides and two faces for supporting said connector in fixed position thereon, a base joined to one side of said end wall and extending in a direction away from one face thereof, said base including means affording tilting movement of said module independently of adjacent modules about said fulcrum and in relationship to other modules to position said end wall of said module in spaced relationship to the end wall of others of said modules in said array affording easy access to the connector for plugging and unplugging distribution lines to said connector and returning the connector to a normal position when the connection is completed.

10. A distribution panel according to claim 9 wherein said base is an elongate narrow strip integrally molded with said end wall.

11. A distribution panel according to claim 10 wherein said base is formed with stop means for limiting the tilting movement of said module.

12. A distribution panel according to claim 9 wherein said base is an elongate narrow strip having a top surface and a bottom surface, said bottom surface having means remote from said end wall to receive said fulcrum for pivotal movement of said base, and cooperating means are provided on said base and on said plate for releasably restricting said tilting movement of said modules in a said array when said end wall of one module is in said side-by-side position in relationship to other said modules.

13. A distribution panel according to claim 11 wherein said means affording tilting movement of said end wall includes a recess in said bottom surface of said base and said stop means is formed by a portion of said bottom surface inclined toward said top surface and away from said recess and said end wall.

14. A distribution panel according to claim 9 wherein said base and said support means have cooperating means to restrict movement of a module when said modules are in the array and positioned in aligned relationship, said means affording movement equal to between one-half and four times the diameter of the connector.

15. A module according to claim 9 wherein said end wall of at least one module supports an optical fiber connector.

16. A module according to claim 9 wherein said end wall of at least one module supports a telephone connector.

17. A module according to claim 9 wherein said end wall of at least one module supports a television antenna connector.

18. A module according to claim 9 wherein said end wall of at least one module supports a phono-type connector.

* * * * *